United States Patent [19]

Siranovich et al.

[11] Patent Number: 5,438,106
[45] Date of Patent: Aug. 1, 1995

[54] FREE RADICAL-CURED COATING COMPOSITIONS

[75] Inventors: Stanley F. Siranovich, Imperial, Pa.; Manfred Bock, Leverkusen, Germany; Lanny D. Venham, Paden City, W. Va.; Terry A. Potter, Beaver, Pa.

[73] Assignee: Miles Inc., Pittsburgh, Pa.

[21] Appl. No.: 153,841

[22] Filed: Nov. 12, 1993

Related U.S. Application Data

[63] Continuation of Ser. No. 942,544, Sep. 9, 1992, abandoned.

[51] Int. Cl.⁶ .......................................... C08F 283/04
[52] U.S. Cl. .................................. 525/440; 525/453; 525/454; 525/455
[58] Field of Search ................ 525/440, 454, 455, 453

[56] References Cited

U.S. PATENT DOCUMENTS 4,829,123  5/1989  Shigematsu et al. ................ 525/28
5,036,113  7/1991  Boon et al. ........................ 522/96

OTHER PUBLICATIONS

"Polyallyl Glycidyl Ether Resins for Very Fast Curing High Performance Coatings", by J. W. Knapczyk, Journal of Coating Technology, vol. 60, No. 756, Jan. 1988.

*Primary Examiner*—James J. Seidleck
*Assistant Examiner*—Mary Critharis
*Attorney, Agent, or Firm*—Joseph C. Gil; Aron Preis; Richard E. L. Henderson

[57] ABSTRACT

A NCO-free, free radical-curable polyurethane coating composition which is particularly suitable for application on heat sensitive substrate is disclosed. The coating contains an allylether-capped isocyanate prepolymer and at least one additional isocyanate prepolymer which is capped with a hydroxyalklyl(meth)acrylate. The composition of the invention yields coatings having good dry time and hardness. An additional embodiment relates to aqueous dispersions of the composition of the invention and to films made therefrom.

8 Claims, No Drawings

FREE RADICAL-CURED COATING COMPOSITIONS

This application is a continuation of application Ser. No. 07/942,544 filed Sep. 9, 1992, now abandoned.

FIELD OF THE INVENTION

The invention concerns a free radical-cured polyurethane coating composition which is characterized in the absence of free NCO therefrom.

SUMMARY OF THE INVENTION

A NCO-free, free radical-curable polyurethane coating composition which is particularly suitable for application on heat sensitive substrates is disclosed. The coating contains an allyl ether-capped isocyanate prepolymer and at least one additional isocyanate prepolymer which is capped with a hydroxyalklyl(meth)acrylate. The composition of the invention yields coatings having good dry time and hardness. An additional embodiment relates to aqueous dispersions of the composition of the invention and to films made therefrom.

BACKGROUND OF THE INVENTION

Radical curable resins which are useful as coatings are well known. Also known are film compositions which contain allyl ether groups which are introduced into the resin in order to impart to the resulting film high air drying properties. Of relevance in this connection is U.S. Pat. No. 4,829,123, which disclosed a composition containing a urethane acrylic oligomer containing an amount of allyl ether groups along with acryloyl or methacryloyl groups. Also of relevance in the present context is an article "Polyallyl Glycidyl Ether Resins for Very Fast Curing High Performance Coatings" by J. W. Knapczyk, Journal of Coating Technology, Vol 60, No 756 January 1988. The use of a polyallyl glycidyl ether in combination with an acrylated urethane is said to provide air drying coating. The coatings thus disclosed are characterized by their low Gardner impact resistance values. The present invention is predicated on the hitherto unrecognized advantages associated with radical cured coatings based on polyester, in particular polycaprolactone, as compared to their polyether based counterparts.

DETAILED DESCRIPTION OF THE INVENTION

The preparation of the prepolymer of the invention is conventional and is known in the coating art. Generally, the prepolymer is prepared by reacting a polyisocyanate with a mixture of polyols. In preparing the prepolymers of the present invention it is important that the mixture of polyols includes about 5 to 20 percent of a high molecular weight polyester polyol and that the mixture be virtually free of polyether polyol.

The polyisocyanates suitable for use in accordance with the present invention include the known polyisocyanates of polyurethane chemistry. Preferred polyisocyanates are those having aliphatically or cycloaliphatically bound isocyanate groups such as hexamethylene diisocyanate, 2,2,4- and/or 2,4,4-trimethyl-1,6-hexamethylene diisocyanate, dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethyl-cyclohexane (isophorone diisocyanate or IPDI), bis-(4-isocyanatocyclohexyl)-methane, 1,3- and 1,4-bis-(isocyanato-methyl)-cyclohexane, bis-(4-isocyanato-3-methyl-cyclohexyl)-methane, xylylene diisocyanate, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, and 2,4- and/or 2,6-hexahydrotoluylene diisocyanate. Also suitable though less preferred are aromatic polyisocyanates such as 2,4- and/or 4,4'-diisocyanatodiphenyl methane and mixtures of these isomers with their higher homologues which are obtained in known manner by the phosgenation of aniline/formaldehyde condensates, 2,4-and/or 2,6-diisocyanato-toluene and mixtures of these compounds.

It is preferred, however, to use derivatives of these monomeric polyisocyanates, as is conventional in coatings technology. These polyisocyanate adducts include polyisocyanates containing biuret groups as described, for example, in U.S. Pat. Nos. 3,124,605, 3,201,372 and DE-OS 1,101,394; polyisocyanates containing isocyanurate groups as described, for example, in U.S. Pat. No. 3,001,973, DE-PS 1,022,789, 1,222,067 and 1,027,394 and DE-OS 1,929,034 and 2,004,048; polyisocyanates containing uretdione groups and prepared by oligomerizing a portion of the isocyanate groups of a diisocyanate in the presence of a trialkyl phosphine catalyst; polyisocyanates containing oxadiazinetrione groups and containing the reaction product of two moles of a diisocyanate and one mole of carbon dioxide; polyisocyanates containing urethane groups as described, for example, in DE-OS 953,012, BE-PS 752,261 and U.S. Pat. Nos. 3,394,164 and 3,644,457; polyisocyanates containing carbodiimide groups as described in DE-PS 1,092,007, U.S. Pat. Nos. 3,152,162 and DE-OS 2,504,400, 2,537,685 and 2,552,350; polyisocyanates containing allophanate groups as described, for example, in GB-PS 994,890, BE-PS 761,626 and NL-OS 7,102,524; and polyisocyanates containing allophanate and isocyanurate groups. Also suitable are polyisocyanate adducts which contain N,N',N"-tris-(6-isocyanatohexyl)-biuret and/or N,N',N"-tris-(6-isocyanatohexyl)-isocyanurate.

The prepolymers may suitably be prepared from a mixture of polyhydroxyl compound, free of polyether polyols, containing low molecular weight polyhydroxyl compounds having a molecular weight of 62 to 299, and about 5 to 20 percent, relative to the weight of the mixture of polyhydroxyl compound, of high molecular weight polyhydroxyl compounds. Among the low molecular weight polyhydroxyl compounds mention may be made of ethylene glycol, propylene glycol, trimethylol propane, 1,6-dihydroxy hexane; low molecular weight, hydroxyl-containing esters of these polyols with dicarboxylic acids of the type exemplified hereinafter; and mixtures of the preceding polyvalent modified or unmodified alcohols.

The high molecular weight polyhydroxyl compounds are known from polyurethane chemistry. These include compounds having a molecular weight of 300 to about 8000, preferably about 1000 to 5000, as determined from the functionality and the OH number. These polyhydroxyl compounds have at least two hydroxyl groups per molecule and generally have a hydroxyl group content of about 0.5 to 17% by weight, preferably about 1 to 5% by weight.

Examples of suitable polyhydroxyl compounds which may be used for the preparation of the prepolymers include the polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid arthydrides. Hydroxyl group-containing polylactones, especially poly-ε-caprolactones, are also suitable for the preparation of the prepolymers.

Also suitable for the preparation of the prepolymers are the hydroxyl group-containing polycarbonates which may be prepared by the reaction of the previously described monomeric diols with phosgene and diaryl carbonates such as diphenyl carbonate.

Curing of the coating of the invention is carried out by a free radical mechanism. Suitable catalysts include cobalt octoate and cobalt-potassium complex, which are normally diluted with methyl ethyl ketone to aid in dispersing the catalyst throughout the composition. Amounts of 0.01 to 0.02 percent, preferably 0.015 percent of the catalyst may be used, the percent being relative to the weight of the composition. The combination of cobalt metal with peroxide is most preferred. A preferred combination contains 0.01 to 0.02 percent cobalt metal and 1.5 to 3.0 percent of MEKP (methyl ethyl ketone peroxide) solution (50% active), the percents being relative to the weight of the composition. Alternatively, a photo sensitizer may be added to the blend of capped prepolymers of the invention and curing may be accomplished by exposure to UV radiation in a manner which is well known in the coating art. Photosensitizers are known and include 2-hydroxy-2-methyl-1-phenyl-propan-1-one. The prepolymers are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present.

The preparation of the coating in accordance with the invention entails reacting a prepolymer with a capping agent selected from the group consisting of allylether and hydroxyalkyl (meth)acrylate, preferably trimethylolpropane diallylether (DAE), 2-hydroxyethyl acrylate (HEA), and 2-hydroxyethyl methacrylate (HEMA). Most preferably, the capping agent is a mixture of said DAE with either one or both of HEA and HEMA. The relative amounts of the reactants are determined in relation to the NCO/OH ratio which is about 1:1.01 to about 1:1.05, preferably 1:1.01.

Curing of the coating is with cobalt/peroxide catalyst or by UV light.

In the preparation of coating compositions in accordance with the invention there are blended a DAE capped prepolymer with at least one prepolymer capped with HEMA or with FLEA, provided however that the composition contains at least 10 percent, preferably 30 to 70 percent, relative to the weight of the blend, of the DAE capped prepolymer.

EXPERIMENTAL

The general procedure for the preparation of the coating of the invention entails charging a three necked flask equipped with a condenser, overhead stirrer, thermometer and nitrogen inlet with an isocyanate, a polyhydroxyl functional compound, solvent and a catalyst. The mixture is heated to 90° C. for 4–5 hours (until the titrated NCO content is equal to or less than the calculated NCO content) and then cooled to 60° C. The capping agent (end group) is then added and the temperature of 60° C. maintained until the content of NCO is 0.5% or less—approximately 4 to 5 hours. The tables below summarize the preparations of the several coating compositions and their properties.

In reference to Table 1, Prepolymer 1 was prepared by reacting 201.7 gm of DES W with 198.3 gms of a polytetramethylene ether glycol having a molecular weight (MW) of about 1000. Prepolymer 2 was prepared from 232.5 gm of DES W and 167.5 gm of polycaprolactone 530 MW, and prepolymer 3 was prepared from 265.5 gm DES W and 709.4 polycaprolactone 2000 MW. Prepolymer 4 was prepared from 157.2 gm DES W and 250.8 gm of 386 (equivalent weight) polyester containing 20% butyl acrylate. The solvent was a 1:1 mixture of methoxypropylacetate and xylene, except that in composition 9 the ratio of methoxypropylacetate to xylene was 59.0/109.1. The catalyst in the preparation of the compositions listed below was dibutyltin dilaurate (0.03–0.2 gms).

TABLE 1

| Composition | Prepolymer | End group type/amount (gm) | amount of solvent (gm) |
|---|---|---|---|
| 1 | 1 | HEA/130.4 | 285.6 |
| 2 | 1 | DAE/240.6 | 345.0 |
| 3 | 1 | HEMA/146.1 | 294.0 |
| 4 | 2 | HEA/129.8 | 285.2 |
| 5 | 2 | HEMA/145.5 | 293.8 |
| 6 | 2 | DAE/239.6 | 344.4 |
| 7 | 3 | HEMA/159.6 | 611.0 |
| 8 | 3 | DAE/262.8 | 666.4 |
| 9 | 4 | HEMA/57.4 and DAE/47.3 | 168.1 |

In Table 2 there are tabulated the formulations of several coatings prepared from the composition of table 1 and their respective properties. The formulations are presented in terms of the amounts (in grams) of the components. Each of the formulations also contained 3.67 gms of a 1:1 mixture of methoxypropylacetate and xylene, 0.42 gms of a 2% cobalt solution and 1.55 gms of a peroxide as catalysts as well as conventional amounts of art recognized leveling agents having no criticality in the present invention. The appearance of the resulting coatings was determined by inspection, Reverse Impact, pendulum hardness and pencil hardness were determined in accordance with ASTM D 2794-84, D 4366-87 and D 3363-74 respectively.

TABLE 2

|  | Coating 1 | Coating 2 | Coating 3 |
|---|---|---|---|
| Components (gm) | | | |
| Composition 7 | 1.20 | 2.40 | 4.80 |
| Composition 8 | 1.20 | 2.40 | 4.80 |
| Composition 5 | 22.80 | 21.60 | 19.20 |
| Composition 6 | 22.80 | 21.60 | 19.20 |
| Properties | | | |
| Appearance | good/glossy | good/glossy | good/less glossy |
| Reverse impact (in*lbs) | 160 | 160 | 160 |
| Pendulum hardness (sec.) | 114 | 116 | 89 |
| Pencil hardnesss* | H | H | H |

The data demonstrates the criticality of the amount of high molecular weight polyol in the preparation of the prepolymer of the invention.

In additional experiments the results of which are presented below coatings were prepared and their properties evaluated. The coatings shown in Tables 3 and 4 were tested in terms of their pendulum hardness after conditioning as noted below. The coatings in accordance with the invention described in Table 3 are based on polyester polyol prepolymer. The properties of these coatings are set in comparison to the coatings of Table 4 which are based on a polyether polyol prepolymer and are not within the scope of the invention.

TABLE 3

| | Coating 4 | Coating 5 | Coating 6 |
|---|---|---|---|
| Components (wt %**) | | | |
| Composition 6 | 50 | 50 | 33.3 |
| Composition 4 | 50 | — | 33.3 |
| Composition 5 | — | 50 | 33.3 |
| Pendulum hardness (sec): | | | |
| cured 20 minutes @ 157° C.** | | | |
| Initial | 120 | 106 | 101 |
| @ 2 weeks | 139 | 142 | 113 |
| @ 4 weeks | 132 | 130 | 133 |
| cured at 60° C. overnight | | | |
| Initial | 157 | 130 | 145 |
| @ 2 weeks | 137 | 123 | 150 |
| @ 4 week | 144 | 130 | 139 |

**approx.

TABLE 4

| | Coating 7 | Coating 8 | Coating 9 |
|---|---|---|---|
| Components (wt %**) | | | |
| Composition 2 | 50 | 50 | 33.3 |
| Composition 1 | 50 | — | 33.3 |
| Composition 3 | — | 50 | 33.3 |
| Pendulum hardness (sec): | | | |
| Cured 20 minutes @ 157° C.** | | | |
| Initial | 55 | 56 | 79 |
| @ 2 weeks | 61 | 61 | 70 |
| @ 4 weeks | 45 | 46 | 45 |
| cured at 60° C. overnight | | | |
| Initial | 82 | 74 | 86 |
| @ 2 weeks | 67 | 66 | 56 |
| @ 4 weeks | 34 | 32 | 17 |

**approx.

Preparation of Coating Composition 10

A three necked flask equipped with a condenser, overhead stirrer, thermometer and nitrogen inlet was charged with 639.6 gm Desmodur W (an aliphatic isocyanate characterized in an NCO content of 32%, a product of Miles Inc.) a 360.0 gm Tone 0305 (a trifunctional polyester polyol a product of Union Carbide), 125 gm xylene and 125 gms of methoxypropyl acetate (PM acetate) and 1.25 gm of a tin catalyst (T-12 which is dibutyl tin dilaurate). The mixture was heated to 80° C. for 4 hours at which time the NCO content was determined to be 9.46% (theoretical 9.6%) and then cooled to 50°-60° C. and 604.8 gm of trimethylolpropane diallyl ether (DAE) 50 gm Xylene and 50 gms of PM acetate were added. An exotherm was noted and the temperature was maintained at 80° C. for about 2 hours. The final solids content was 82%.

Preparation of Coating Composition 11

A three necked flask equipped with a condenser, overhead stirrer, thermometer and nitrogen inlet was charged with 640.0 gm Desmodur W, a 360.0 gm Tone 0305, 125 gm xylene and 125 gms of PM acetate and 1.0 gm of a T-12. The mixture was heated to 80° C. for 4 hours at which time the NCO content was determined to be 9.4% (theoretical 9.6%) and then cooled to 50°-60° C. and 364.4 gm of 2-hydroxyethylmethacrylate (HEMA) 100 gm Xylene and 100 gms of PM acetate were added. An exotherm was noted and the temperature was maintained at 80° C. for about 2 hours. The final solids content was 74%.

Preparation of Coating Composition 12

A 50/50 (by weight) mixture of coating composition 10 and 11 was prepared. To this mixture there was added a cobalt catalyst (Nuocure CK, a product of Nuodex Inc., 0.015 wt % Co metal based on the total formulation) and methyl ethyl ketone peroxide solution (2.8 wt % based on the total formula) and films drawn down at 2 and 5 mil wet film thickness. The dry times were measured on the 2 mil film. Pendulum hardness was determined on the 5 mils film.

TABLE 5

Prepolymers based on Desmodur W and polycaprolactone

| Composition (eq) | 10 | 11 | 12* | 13 |
|---|---|---|---|---|
| Desmodur W | 4.86 | 4.86 | — | 4.43 |
| Triol | 2.00 | 2.00 | — | — |
| Diol | — | — | 1.57 | — |
| NCO/OH | 2.43 | 2.43 | — | 2.82 |
| % NCO | 12.0 | 12.0 | — | 12.0 |
| Capping agent | DAE | HEMA | DAE/HEMA | TMPDAE** |
| Properties: | | | | |
| Dry time, hrs (1) | | | | |
| Tackfree | 1.5 | 5 | 1 | 5 |
| Marfree | 7.5 | 16.75 | 4.5 | >24 |
| Viscosity, cps (2) | | | | |
| Initial | 208 | 222 | 220 | 66 |
| 18 hours | 383 | 255 | gel | 80 |
| 4 days | 594 | gel | — | 93 |
| Pendulum hardness: | | | | |
| air dry (3) | | | | |
| 19 hours | 25 | 14 | 54 | — |
| 4 days | 46 | 41 | 80 | 33 |
| 6 days | 60 | 54 | 90 | 41 |
| 8 days | 73 | 58 | 97 | 50 |
| 19 days | 121 | 74 | 126 | 84 |
| 60° C. gravity Oven | | | | |
| 4 hours | 87 | 151 | 133 | 118 |
| 24 hours | 154 | 167 | — | 140 |

*a 50/50 mixture of 10 and 11
**trimethylolpropane DAE
(1) 24 hours Gardner Dry Time Meter, 2 mil WFT. Initiator level 0.015 wt % CP metal, 2.8 wt % MEKP
(2) about 50% NVM
(3) 5 mils WFT The data below demonstrates the difference between the inventive film and a corresponding film which is outside the scope of the invention in terms of the pendulum hardness values. In the tables below there are shown the pendulum hardness values (seconds) as a function of bake conditions (temperature and time) of the prepolymer of composition 10 above which is outside the scope of the invention and composition 12 which represents the invention.

TABLE 6

Pendulum hardness (seconds) of prepolymer of composition 10

| | Bake Time (minutes) | | | | | |
|---|---|---|---|---|---|---|
| Bake temperature (°C.) | 5 | 10 | 15 | 20 | 30 | 45 |
| 49 | — | — | — | — | 9 | 11 |
| 66 | — | 7 | 10 | 20 | 22 | 24 |

TABLE 6-continued

Pendulum hardness (seconds) of prepolymer of composition 10

| Bake temperature (°C.) | Bake Time (minutes) | | | | | |
|---|---|---|---|---|---|---|
| | 5 | 10 | 15 | 20 | 30 | 45 |
| 93 | — | 23 | 21 | 16 | 35 | 41 |
| 121 | 26 | 27 | 27 | 34 | 46 | 41 |

TABLE 7

Pendulum hardness (seconds) of prepolymer of Composition 12

| Bake temperature (°C.) | Bake Time (minutes) | | | | | |
|---|---|---|---|---|---|---|
| | 5 | 10 | 15 | 20 | 30 | 45 |
| 49 | 18 | 26 | 33 | 46 | 59 | 65 |
| 66 | 26 | 43 | 80 | 62 | 71 | 85 |
| 93 | 54 | 85 | 97 | 88 | 105 | 101 |
| 121 | 89 | 89 | 105 | 128 | 122 | 138 |

Additional compositions (14 through 27) have been prepared following the procedure outlined above. The properties of these are shown in the following tables.

TABLE 8

Prepolymers based on Desmodur W and polyester polyol*

| Composition (eq) | 14 | 15 | 16 | 17 |
|---|---|---|---|---|
| Desmodur W, eq | 2.08 | 2.58 | 1.19 | 1.51 |
| Desmophen 670-80 | 0.90 | 0.77 | 0.52 | 0.45 |
| NCO/OH | 2.31 | 3.35 | 2.29 | 3.36 |
| % NCO | 7.9 | 11.9 | 7.9 | 11.9 |
| Capping agent | DAE | DAE | DAE/HEMA | DAE/HEMA |
| Properties: Dry time, hrs (1) | | | | |
| Tackfree | (1) | 3.5 | 2.5 | 3 |
| Marfree | — | 9 | 20 | 10 |
| Viscosity, cps | | | | |
| Initial | 80,000 | 573 | 2,720 | 132 |
| 1 hour | (1) | 528 | 2,420 | 126 |
| 2 hours | — | 537 | 2,480 | — |
| 4 hours | — | 640 | — | gel |
| 14 hours | — | 940 | gel | — |
| % NVM | 50 | 60 | 49 | 45 |
| Pendulum hardness:(sec) | | | | |
| Air dry (3) | | | | |
| 15 hrs @ 60° C. | 45 | 53 | 177 | 174 |
| 4 days @ r.t | 62 | 64 | 189 | 183 |
| 15 hrs @ 60° C. | 127 | 115 | 188 | 176 |
| 15 hrs @ 60° C. | 144 | 145 | — | — |

(1) dry time and pot life not measured because of 80,000 cps viscosity.

TABLE 9

Prepolymers based on Desmodur W and PTMEG or polycaprolactone

| Composition (eq) | 18 | 19 | 20 | 21 | 22 | 23 |
|---|---|---|---|---|---|---|
| Desmodur W | 1.53 | 1.53 | 1.53 | 1.77 | 1.77 | 1.77 |
| PTMEG* | 0.40 | 0.40 | 0.40 | — | — | — |
| Polycaprolactone | — | — | — | 0.63 | 0.63 | 0.63 |
| NCO/OH | 3.82 | 3.82 | 3.82 | 2.81 | 2.81 | 2.81 |
| % NCO | 11.9 | 11.9 | 11.9 | 11.9 | 11.9 | 11.9 |
| Capping agent | HEA | DAE | HEMA | HEA | HEMA | DAE |
| Viscosity, cps | 290 | 234 | 222 | 405 | 300 | 266 |

All above prepolymers at 65 wt % in 1/1 PMA/xylene by weight.
*PTMEG denotes polytetramethylene ether glycol.

The table below summarized the properties of the film prepared on the basis of composition 18–20. The films described as composition 24 were made of 1/1 by weight of compositions 18 and 19 and the film of composition 25 were made of a 1/1 mixture of compositions 19 and 20.

TABLE 10

| Composition (eq) | 18 | 19 | 20 | 24 | 25 |
|---|---|---|---|---|---|
| Capping agent | HEA | DAE | HEMA | DAE/HEA | DAE/HEMA |
| Properties: | | | | | |
| Gardner dry time, hrs (1) | | | | | |
| Tackfree surface dry | 4.5 | 9.5 | 7.0 | 6.5 | 4.0 |
| Hard dry | 7 | 11 | 18.25 | 8 | 8 |
| Marfree | 24 | 24 | 24 | 14.0 | 11.5 |
| Viscosity, cps (2) | | | | | |
| Initial | 230 | 195 | 182 | 213 | 196 |
| 1 hour | 222 | 182 | 183 | 196 | 175 |
| 3 hours | — | 200 | 170 | gel | gel |
| 6 hours | 210 | 213 | gel | | |
| 7 hours | 207 | 216 | | | |
| 1 day | gel | 234 | | | |
| 11 days | 314 | | | | |
| Pendulum hardness: (sec) | | | | | |
| 1 day | 16 | — | 17 | 23 | 23 |
| 2 weeks | — | — | — | 62 | 60 |
| 3 weeks | 29 | 31 | 20 | — | — |
| 4 weeks | 22 | 36 | 14 | 63 | 63 |

0.015 wt % CO metal based on total formulation
2.8 wt % MEKP solution (approx. 50% active) based on total formulation.

The table below summarized the properties of the film prepared on the basis of composition 21–23. The films described as composition 26 were made of 1/1 by weight of compositions 21 and 23 and the film of composition 27 were made of a 1/1 mixture of compositions 22 and 23.

TABLE 11

| Composition (eq) | 21 | 22 | 23 | 26 | 27 |
|---|---|---|---|---|---|
| Capping agent | HEA | HEMA | DAE | DAE/HEA | DAE/HEMA |
| Properties: | | | | | |
| Gardner dry time, hrs (1) | | | | | |
| Tackfree surface dry | 24 | 24 | 7 | 3.5 | 2.75 |
| Hard dry | 24 | 24 | 9 | 8 | 4.25 |
| Marfree | 24 | 24 | 24 | 24 | 24 |
| Viscosity, cps (2) | | | | | |
| Initial | 275 | 215 | 203 | 218 | 188 |
| 1 hour | — | 205 | 177 | 202 | — |
| 2 hours | 267 | 200 | — | — | 232 |
| 3 hours | — | — | 196 | gel | gel |
| 7 hours | 230 | 188 | 202 | | |
| 8 hours | 227 | 184 | — | | |
| 1 day | gel | gel | gel | | |
| Pendulum hardness: (sec) | | | | | |
| 1 day | — | — | — | 19 | 27 |
| 2 weeks | — | 11 | 26 | 62 | 75 |
| 3 weeks | — | 10 | 33 | 62 | 74 |
| 4 weeks | — | 33 | 65 | 92 | 108 |

0.015 wt % CO metal based on total formulation
2.8 wt % MEKP solution (approx. 50% active) based on total formulation.

In an additional embodiment, the prepolymer of the present invention may be made to disperse in waiter by incorporating therewith a diol acid in an amount which will yield about 1 to 4 percent of carboxylic acid groups in the prepolymer, the percents being relative to the weight of the prepolymer. A preferred diol acid is dimethylolpropionic acid. Compositions 1A and 2A were prepared following the procedure described below and the properties of the resulting coatings were determined as shown in Table 12.

Preparation of Composition 1A

Into a three-necked flask equipped with a condenser, overhead stirrer, thermometer and nitrogen inlet there was charged: 599.1 gm Desmodur W. 340.0 gm Tone 0200, 60.98 gm dimethylolpropionic acid, 150.0 gm N-methyl pyrrolidinone, and 0.2 gm dibutyltin dilaurate. The mixture was heated to 90° C. for about 4 hours (until the titrated NCO content is about 8.0%). The solution was then cooled to 60° C. and 305.0 gm of 2-hydroxyethyl methacrylate was added. The temperature was maintained for about 4 hours (until less than 0.5% NCO content was found by titration). To this solution at 60° C. there was stirred 45.9 gm triethylamine. A portion (552.7 gm) of this prepolymer solution was then added slowly to 1000 gm of deionized water and the solution vigorously agitated.

Preparation of Composition 2A

Into a three-necked flask equipped with a condenser, overhead stirrer, thermometer and nitrogen inlet there was charged: 599.1 gm Desmodur W. 340.0 gm Tone 0200, 60.98 gm dimethylolpropionic acid, 150.0 gm N-methyl pyrrolidinone, and 0.2 gm dibutyltin dilaurate. The mixture was heated to 90° C. for about 4 hours (until the titrated NCO content is about 8.0%). The solution was then cooled to 60° C. and 516.2 gm of trimethylolpropane diallylether was added. The temperature was maintained for about 4 hours (until less than 0.5% NCO content was found by titration). To this solution at 60° C. there was stirred 45.9 gm triethylamine. A portion (302.0 gm) of this prepolymer solution was then mixed with 0.75 gm of a 12% cobalt metal solution and added slowly to 576.6 gm of deionized water and the solution vigorously agitated.

The coatings based on these aqueous dispersions were cured at 110° C. for 30 minutes.

TABLE 12

| | Coatings based on aqueous dispersions | |
|---|---|---|
| component (gm) | coating 1 | coating 2 |
| composition 1A | 6.0 | 6.0 |
| composition 2A | 6.0 | 6.0 |
| MEKP* | 0.2 | 0.2 |
| NMP** | 0.8 | — |
| NVP*** | — | 0.8 |
| Appearance | slightly yellow | yellow |
| Pencil hardness | HB | HB |

MEKP* denotes methyl ethyl ketone peroxide, 50% active solution.
NMP** denotes N-methyl pyrrolidinone
NVP*** denotes N-vinyl pyrrolidinone Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for preparing an NCO-free, free radical curable polyurethane coating comprising (i) preparing an isocyanate based prepolymer by reacting a polyisocyanate and a polyol to produce a prepolymer having an NCO content of about 8 to 12 percent by weight and (ii) end capping said prepolymer with trimethylolpropane diallylether and with at least one member selected from the group consisting of 2-hydroxyethyl acrylate and 2-hydroxyethyl methacrylate to produce an end-capped prepolymer, and (iii) mixing said end-capped prepolymer with an initiator, provided however that said polyol includes about 5 to 20 percent relative to the weight of said polyol of a polyester polyol having a molecular weight of about 300 to 8000 and that said polyol is free of polyether polyol.

2. The method of claim 1 wherein said member is selected from the group consisting of 2-hydroxyethyl acrylate.

3. The coating prepared by the method of claim 1.

4. The coating prepared by the method of claim 2.

5. The method of claim 1 wherein said prepolymer further incorporates in its structure a diol acid in a sufficient amount to yield about 1 to 4 percent of carboxylic acid groups in said prepolymer, said percent being relative to the weight of said prepolymer.

6. The method of claim 5 wherein said acid diol is dimethylolpropionic acid.

7. The coating prepared by the method of claim 5.

8. A method for preparing an NCO-free, free radical curable polyurethane coating comprising (i) preparing an isocyanate based prepolymer by reacting a polyisocyanate and a polyol to produce a prepolymer having an NCO content of about 8 to 12 percent by weight and (ii) end capping said prepolymer with trimethylolpropane diallylether and with at least one member selected from the group consisting of 2-hydroxyethyl acrylate and 2-hydroxyethyl methacrylate to produce an end-capped prepolymer, and (iii) mixing said end-capped prepolymer with an initiator, provided however that said polyol includes about 5 to 20 percent relative to the weight of said polyol of a polyester polyol having a molecular weight of about 1000 to 5000 and that said polyol is free of polyether polyol.

* * * * *